United States Patent [19]

Robert

[11] 4,397,408
[45] Aug. 9, 1983

[54] SURFACE TENSION STORAGE DEVICE WITH BUFFER-TANK

[75] Inventor: Michel Robert, Montigny le Bretonneux Trappes, France

[73] Assignee: Societe Europeenne de Propulsion, Puteaux, France

[21] Appl. No.: 272,384

[22] Filed: Jun. 10, 1981

[30] Foreign Application Priority Data

Jul. 8, 1980 [FR] France .................. 80 15189

[51] Int. Cl.³ .......................................... B65D 83/14
[52] U.S. Cl. ....................................... 222/394; 261/104
[58] Field of Search .............. 137/177, 574, 576, 590; 261/104, 107; 55/431, 392; 222/187, 394, 399

[56] References Cited

U.S. PATENT DOCUMENTS

| | | | |
|---|---|---|---|
| 3,176,882 | 4/1965 | Meermans | 222/187 |
| 3,486,302 | 12/1969 | Paynter | 55/159 |
| 3,744,738 | 7/1973 | Howard | 222/414 |
| 4,168,718 | 9/1979 | Hess et al. | 137/590 |

FOREIGN PATENT DOCUMENTS 2254494 7/1975 France .
2283390 3/1976 France .
2372642 6/1978 France .

Primary Examiner—Joseph J. Rolla
Assistant Examiner—Charles C. Compton
Attorney, Agent, or Firm—Weingarten, Schurgin, Gagnebin & Hayes

[57] ABSTRACT

The invention relates to a storage system comprising: an enclosure containing a liquid and a pressurant gas and a liquid-expelling device comprising a structure made up of rigid elements which define a grid-like interior surface forming a gas barrier and which delimit a central outlet passage and gaps whose width increases as a function of the distance to the central passage from a minimum value selected for the said gas barrier, to a maximum value selected so as to prevent the liquid contained inside the structure from being expelled into the enclosure as long as the acceleration does not exceed a given threshold, said structure constituting a buffer-tank from where the liquid can be expelled through the central passage under the effect of the gas at every phase of utilization and which is re-filled with liquid contained inside the enclosure by means of a feeding device which converges to a liquid input provided in the structure.

15 Claims, 7 Drawing Figures

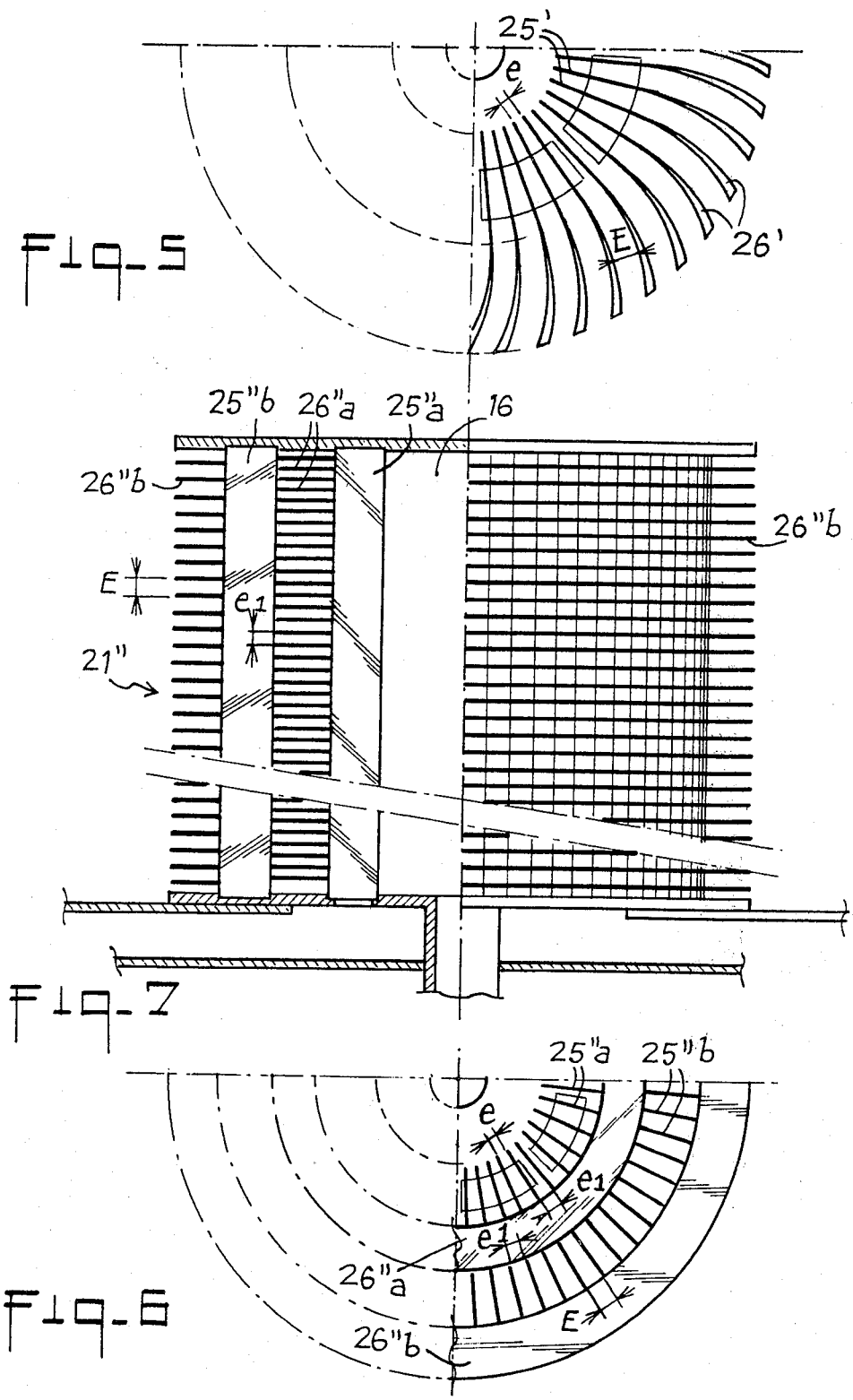

SURFACE TENSION STORAGE DEVICE WITH BUFFER-TANK

The present invention relates to a surface tension storage system of the type comprising: an enclosure designed to contain a liquid and a pressurant gas, a liquid-expelling device situated close to an outlet of said enclosure and means for feeding liquid to the expelling device.

The device according to the invention is more particularly designed for the storge of propellants on board satellites or on board three-axes stabilized platforms. With such satellites there is no privileged direction of the acceleration ensuring the presence of the propellant in a predetermined area of the storage enclosure. The ambient acceleration remains low and its direction can vary with respect to the enclosure, said acceleration being linked either to disturbing torques, or to the activation of the system controlling the attitude and orbit.

It has been proposed to produce storage devices in the form of spherical enclosures in which a collector system brings the liquid towards the outlet whatever the position of the liquid inside the enclosure. Said collector system is composed for example of tubes whose wall is constituted at least partly by a screening, which tubes are situated in those areas where the liquid is likely to be found, and in particular along the inside wall of the tank. When the screening is wetted, it prevents the gas from entering inside the collector tubes as long as the difference in the pressures being applied on either side of the screening remains below the pressure differential value at which the liquid-gas interface meniscuses created between the liquid and the gas and situated between the pores of the screening are disrupted. This limit value is thereafter referred to as pressure difference threshold value. Said collector tubes reach the outlet which is provided with one or more gas barriers constituted by screenings which prevent any gas that may be present in the tubes from being expelled with the liquid and from perturbing the operation of the device using said liquid.

The screenings raise problems of cleaning, of stability of said pressure difference threshold value, of fitting and of resistance to corroding caused by the stored liquid. Moreover, in the case for example of propellant storage in a satellite required to carry out a long mission, it is advisable to make available relatively rapidly and everytime it is necessary, a certain quantity of propellant to conduct, for example, an attitude control or an orbit control. The particular object of the invention is to propose a storage system offering such a possibility and not requiring the use of screenings in the liquid expelling device.

This object is reached with a storage device of the type defined hereinabove, and wherein, according to the invention, the liquid expelling device consists in a structure made up of an assembly of rigid elements defining:

a grid-like interior surface of the structure which delimits a central passage surrounded by the structure and communicating with the outlet, a grid-like exterior surface which opens on to the inside of the enclosure, a set of gaps delimited by the surfaces of the said elements, which extend continuously between the interior surface and the exterior surface of the structure and the width of which increases in relation to the distance to the central passage, from a minimum value selected so as to form a gas barrier along the inner surface delimiting the central passage, up to a maximum value selected so as to prevent the liquid contained inside the structure from being expelled into the tank, as long as the ambient acceleration does not exceed a given threshold, and a liquid input to where the feeding system arrives, said structure constituting a buffer-tank from where the liquid may be expelled through the central passage under the effect of the pressurant gas at each liquid-utilizing phase and which is re-filled with the liquid contained in the enclosure by means of the feeding device.

With the system according to the invention, a certain amount of liquid is trapped by capillarity inside the structure, which structure occupies only a small fraction of the overall free volume of the enclosure. Said amount of liquid should enable to ensure the operation, for a predetermined duration, of one or more apparatus such as engines, using the liquid. The buffer-tank is re-filled by capillary flow during the periods of weightlessness.

The stability of the liquid inside the buffer-tank around the central passage is due to the fact that the width of the gaps between adjacent elements of the structure is an increasing function of the distance to the central passage. By "increasing function" it is meant here that the said width does not reduce in any part of the structure from the inside limit thereof which defines the central passage to the outside limit, in the radial direction. The width can therefore remain constant over a larger or smaller radial distance of the structure. The preference goes to a width increasing, in the strict sense, at least in one part of the structure situated all around the central passage and bordering the latter, in order to help, if necessary, a "re-centering" of the liquid around the said central passage, as will be explained in detail hereinafter.

At the limit with the central passage, the elements of the structure form a gas barrier, whose pressure difference threshold value, all other things being equal, is determined by the width of the gaps between elements at that level, i.e. the minimum width value of the gaps between elements. As to the maximum width value, this determines, all other things being equal, the maximum value of the accelerations which may be applied to the storage system without the liquid contained inside the buffer tank risking to be expelled therefrom, and into the enclosure.

The invention will be more readily understood on reading the following description, with reference to the accompanying drawings, in which:

FIGS. 5 and 6 are two cross-sections of two other embodiments of the buffer tank in a storage system according to the invention; and FIG. 7 is a view showing half a meridian section of the buffer-tank illustrated in FIG. 6.

Figure 1:
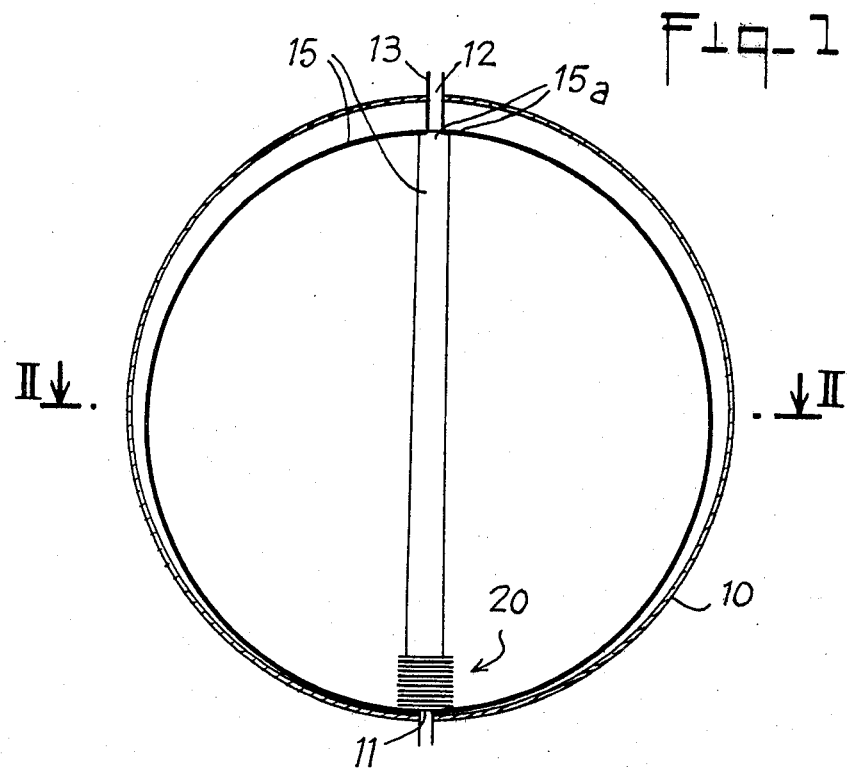
FIG. 1 is a diagrammatical view of a meridian section of a storage system according to the invention.
Figure 2:
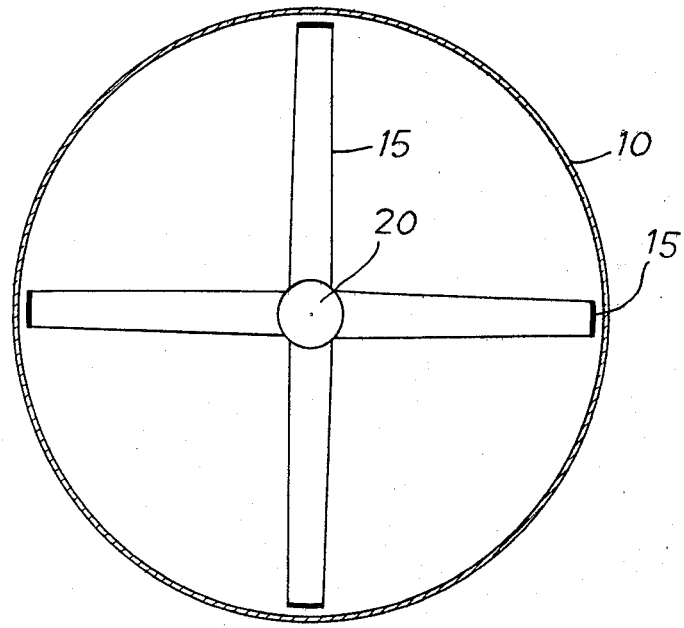
FIG. 2 is a sectional view along line II—II of FIG. 1.

FIGS. 1 and 2 illustrate a satellite propellant storage system comprising a spherical enclosure 10, a liquid outlet 11 provided in the wall of the enclosure, a liquid expelling device 20 communicating with the outlet 11 and a feeding device made up of blades 15 converging to the liquid-expelling device 20. An aperture 12 is provided in the wall of the enclosure in an area situated substantially opposite that where the outlet 11 is situated. A pipe 13 is connected on the aperture 12 to create a communication between a tank (not shown) containing a pressurant gas and the inside of the enclosure 10.

Figure 3:
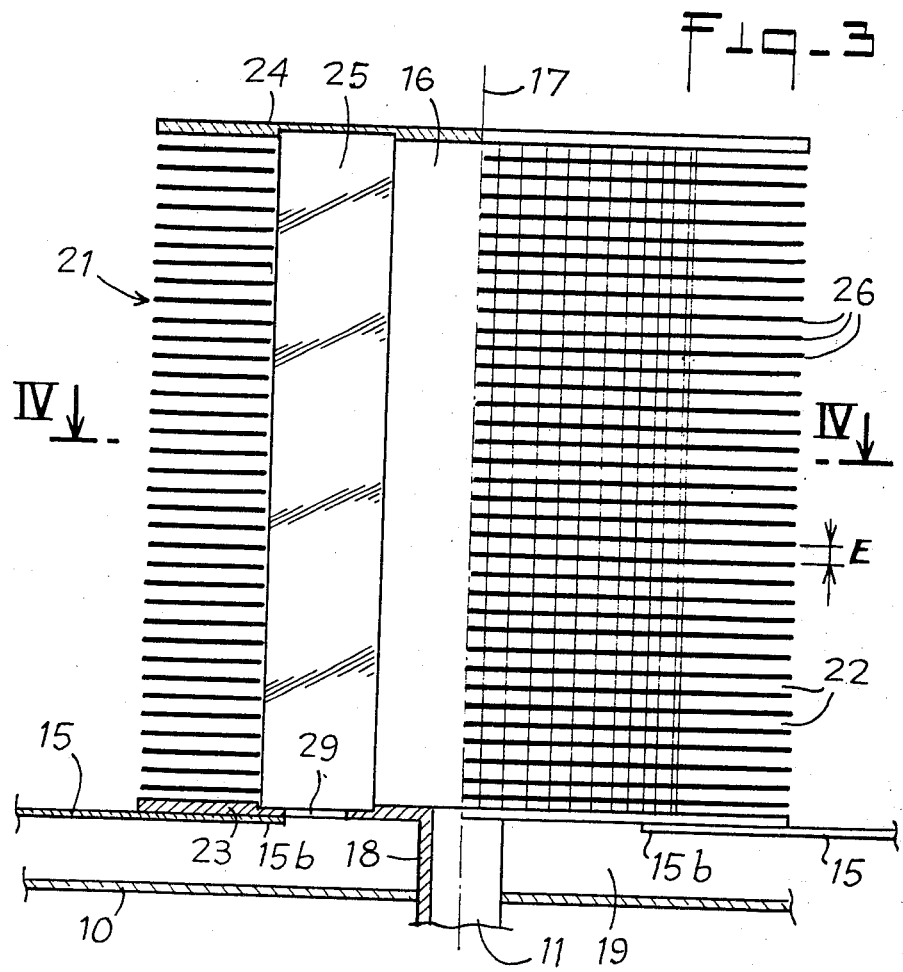
FIG. 3 is a detailed view, on a larger scale, of half a meridian section of the buffer tank of the storage system according to FIGS. 1 and 2.
Figure 4:
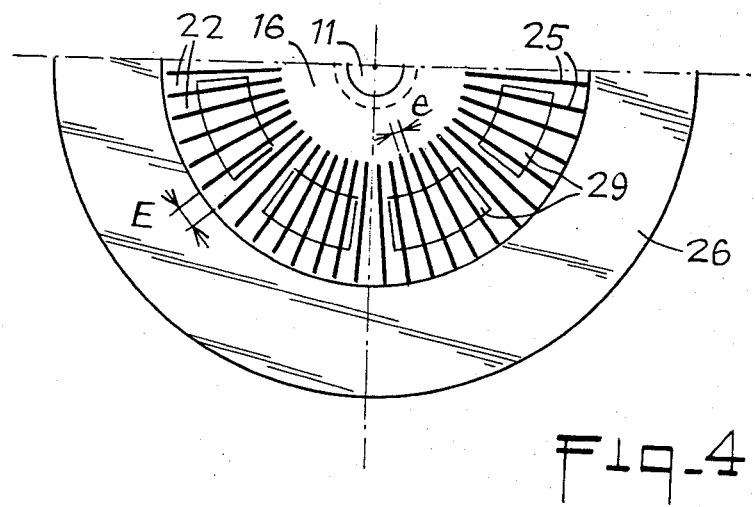
FIG. 4 is a half cross-section along IV—IV of FIG. 3.

The output device 20 is illustrated in more details in FIGS. 3 and 4. It comprises a laminated structure 21 surrounding a central passage 16. Said laminated structure 21 is composed of plane elements, such as for example metal sheets defining between them gaps 22 which are open on the inner and outer faces of the structure 21. The width d of the gaps 22 varies from a value e on the interior surface of the structure 21 to a value E on the exterior surface of the structure 21, without reducing anywhere between these limits. The value E is greater than the value e.

The passage 16 is a cylindrical-shaped channel of circular cross-section, the axis 17 of which is perpendicular to the enclosure wall and in line with the axis of the outlet 11. A pipe 18 joins one end of the passage 16 to the outlet 11 through a base plate 23 which supports the laminated structure. The other end of the passage 16 is closed off by a closing plate 24. The side wall of the passage 16 is the interior surface of the laminated structure defined by the inside edges of the structure elements immediately surrounding the passage 16.

The plate 23 creates a gap 19 with the part of interior wall of the enclosure 10 which surrounds the outlet 11.

During the period of time when the storage system is in the use, the enclosure 10 contains a liquid and the pressurant gas, and the laminated structure acts as a buffer-tank between the interior of the enclosure 10 and the outlet 11.

The volume of liquid trapped in the gaps 22 is greater than the maximum quantity which can be used for an operation requiring the use of said liquid. But the volume occupied by the laminated structure 21 is only a small fraction of the overall free volume of the enclosure (See FIG. 1).

During each phase of utilization of the liquid, said liquid is drawn through the passage 16 to be brought to a user device not shown such as for example one or more engines. When the liquid is allowed downstream of the outlet 11, it flows outside the enclosure 10 under the effect of the pressure from the pressurant gas. Between two phases of utilization, the buffer-tank is refilled as will be explained hereinafter.

The buffer-tank works accurately as long as the capillary forces which exist at the level of the liquid/gas interface meniscuses in the gaps 22 can oppose the difference between the pressures exerted on either side of said meniscus, and this in order to prevent:

the liquid from being expelled from the buffer-tank into the enclosure 10 through the ends of the gaps situated on the exterior side of the structure 21, and the pressurant gas bubbles from penetrating into the central passage when a meniscus reaches the interior limit of the structure 21 and as long as a substantial quantity of liquid remains in the tank.

The difference between the pressures exerted on a liquid-gas interface meniscus in a gap 22 comprises a first component PH which represents the difference of hydrostatic pressure linked to the existence of an ambient acceleration and a second component PV which represents the load losses due to the liquid flow.

On the periphery of the laminated structure, the component PH is predominant, the load losses due to the liquid flow being negligible due to the short progress accomplished by the liquid. The maximum difference of maximum pressure that a meniscus has to bear in that area is therefore substantially proportional to the maximum ambient acceleration under which the buffer-tank is caused to operate and to the greatest dimension of the structure 21. The voluminal capacity required by the buffer-tank and the maximum acceleration having been specified, the external dimensions of the laminated structure and the maximum value E of the gap width can be determined. To make constructions easier, it is possible to give the laminated structure 21 a cylindrical general shape with circular cross-section of axis 17 and of rectangular meridian section.

The losses of load due to the flow of liquid in the central passage 16 should preferably be as low as possible to minimize the component PV. To this effect, the central passage is selected to have a large enough flowing section, such as for example, a diameter of between 1 and 5 cm. Beyond 5 cm, there is no significant reduction in the losses of load, but then, it becomes necessary to increase the number of elements in the laminated structure in order to keep a small enough minimum gap width e with all the problems that this creates for the weight and overall volume of the laminated structure.

Said minimum value e is one of the factors which determine the pressure difference threshold value of the gas barrier formed by the elements of the structure 21 around the central passage 16. The smaller the distance e, the higher the pressure difference threshold value. The said pressure difference threshold value is increased by increasing the number of elements of laminated structure bordering the central passage; but then the losses of viscosity are greater, hence an increase of the component PV which can reach an inacceptable level with respect to the pressure difference threshold value, at the internal end of the gaps.

By way of indication, the minimum width e for a gap can be between 0.3 and 1 mm approximately.

As already indicated, the width d is preferably strictly increasing in the area closest to the central passage 16 to allow a possible "re-centering" of the liquid after a liquid-expelling phase.

Indeed, at the end of a liquid-expelling phase, and especially if only a small amount of liquid is left inside the enclosure, liquid-gas interface meniscuses can occur in the gaps 22 at different distances from the central passage 16 and even on the limit thereof. If the positions of these meniscuses remain unchanged until the next liquid extraction phase, bubbles of pressurant gas could penetrate into the passage 16 through the gaps containing less liquid and whilst a substantial quantity of liquid may be left in the buffer-tank. This is prevented due to the fact that the liquid is re-centered in weightlessness around the passage 16 since meniscuses tend to occur in areas of gaps of substantially equal width. The re-centering of the liquid in the buffer-tank thus permits an optimum use of the liquid stored before the pressurant gas crosses the gas barrier.

In the case of the special embodiment illustrated in FIGS. 3 and 4, the structure 21 comprises a first part situated on the interior, in which the gap width increases from its minimum value e at the level of the central passage 16 to its maximum value E, a second part in which the gap width remains equal to E. The first part is constituted by plane radial blades 25 which are situated in meridian planes, and distributed regularly at an angle around the axis 17, all of said blades having the same dimensions. The second part of the structure 21 is composed of identical plane rings or discs 26 regularly spaced out, which surround the blades 25 and are perpendicular to the axis 17. The inner diameters of the discs 26 are equal to the external diameter of the cylinder in which the blades 25 are inscribed. The circular base plate 23 supports the laminated structure, and the closing plate 24 is a solid circular plate covering the whole structure 21. Said plates 23 and 24 have the same external diameter as the discs 26 and are separated from those discs adjacent to them by a distance equal to E. The structure assembly thus constituted has the shape of a cylinder of circular cross-section and of square meridian section.

The dimensions and the number of the blades 25 and of the discs 26 are determined in relation for example to the voluminal capacity required for the buffer-tank, and to the maximum pressure differences which the gas-liquid interface meniscuses occurring in the gaps 22 have to withstand, as indicated hereinabove. Other considerations may of course be involved, such as for example the mass of the structure, its manufacture and the mechanical resistance required for it, the latter having a bearing on the choice of the thickness of the elements constituting said structure and therefore reacting on the space coupled by these elements in the buffer-tank.

The following detailed example of an embodiment of a buffer-tank for a storage system according to the invention is given by way of illustration and non-restrictively.

To simplify the manufacture, the shape selected is that shown in FIGS. 3 and 4.

The liquid is nitrogen peroxide. The minimum volume of liquid to be stored inside the buffer-tank has been fixed to 1,500 cm$^3$ and the maximum acceleration to be sustained during operation is 0.052 m/s$^2$.

In view of the volume to be stored and of the estimated space needed by the elements of the structure, an external diameter and an axial overall length equal to 15 cm have been selected for said structure.

The maximum hydrostatic depression (along a diagonal of the cylinder) is of 16 Pa, this imposing a maximum value of about 2.7 mm for the gap width E.

In addition, the diameter of the passage 16 is selected to be 30 mm to ensure that the losses of load due to the flow inside said passage will be negligible.

The blades 25 and discs 26 are produced in sheet metal of thickness equal to 0.5 mm. Considering the diameter chosen for the passage 16 and that the minimum gap width has to be less than 2.7 mm the number of blades should be at least equal to 30.

In the end, the minimum value e for the gap width is selected to be 0.5 mm, which does not over-complicate the operations of production and does not involve too great a value of losses of load through liquid flowing into the gaps between the blades. The number of blades is therefore fixed to 94.

The maximum value E for the gap width is selected to be at least equal to 2 mm to leave a wide enough margin with respect to the limit value calculated. Said gap width is reached between the blades 25 at a distance from the axis 17 equal to about 77 mm.

The discs 26 have therefore inner and external diameters equal respectively to 74 and 150 mm and their number is equal to 60.

The buffer-tank produced in this way has the following characteristics:
Free volume for this liquid:
  1,987 cm$^3$;
Tolerable maximum acceleration:
  0.072 m/s2;
Maximum loss of load due to liquid flowing between the discs for the maximum flow rate required (70 cm$^3$/s):
  0.002 Pa;
Maximum loss of load due to the liquid flowing between the blades:
  1.6 Pa.

In the case of the buffer-tank illustrated in FIGS. 3 and 4 the discs 26 create an extension of the volume inside the buffer-tank comparatively to the free volume between the blades. Said extension is achieved without increasing the gap width. By comparison, it will be noted that, if radial blades only were used, an increase in the volume of the buffer-tank would make it necessary to increase the number of blades, in order that the gap width retains a value less than the limit imposed, with all the problems of mass, space required, and production at the level of the internal limit of the structure, that this would entail.

The embodiment of the buffer-tank illustrated in FIGS. 3 and 4 is therefore particularly advantageous, but other embodiments can also be adopted.

In the example illustrated in FIG. 5, the buffer-tank is formed by a structure, consisting of an assembly of radial blades 25' similar to the blades 25 and extended by fixed vanes 26', substantially spiral-shaped, disposed in parallel to the axis of the central passage and separated one from the other by intervals of constant width, equal to the width E separating the external ends of the blades 25'.

According to yet another variant, the buffer-tank may consist, from the interior towards the exterior, of a succession of assemblies of, alternately, meridian blades and transverse discs. Thus, in the example illustrated in FIGS. 6 and 7, the laminated structure 21" comprises successively, meridian blades 25"a along which the width of the gap increases from the value e to a value $e_1$, transverse discs 26"a regularly separated by a gap width equal to $e_1$, meridian blades 25"b along which the gap width increases from the value $e_1$ to the value E and transverse discs 26"b regularly separated by a gap width equal to E.

Reverting to FIGS. 1 to 4, the device permitting to re-fill the buffer-tank with liquid during the weightlessness period which follows each phase during which liquid is expelled from said buffer-tank into the passage 16 via the outlet 11, will now be described.

The re-filling of the buffer-tank is conducted from the gap 19 through one or more apertures 29 provided in the base plate 23. Said apertures are provided under the gaps between the meridian blades 25 at a distance from the limit with the central passage 16.

The liquid required to re-fill the buffer-tank is brought into the space 19 by the collector blades 15. Said latter, which may be four in number, are distributed regularly at an angle and are arranged along the interior wall of the enclosure 10 (FIG. 1). At one end 15a, the blades 15 are joined together. At their end 15b, said blades 15 are joined to the base plate 23 (FIG. 3). As can be seen in FIGS. 1 and 2, the interval between the blades 15 and the interior wall of the enclosure 10 decreases from the end 15a to the end 15b whereas the width of the blades 15 increases.

Said blades 15 collect the liquid which is preferably against the interior wall of the enclosure. In weightlessness, the liquid tends to wet the largest surface possible and therefore settles between the blades 15 and the wall of the enclosure 10 until it reaches the level of the buffer-tank and fills the latter. The fact that the blades are placed so that their distance to the wall of the enclosure decreases towards the buffer-tank, increases the liquid "pumping" effect towards said tank. It will be noted that said distance should remain greater than the minimum value e of the width between gaps, and preferably, at the maximum value E of said width so that the liquid is preferably stabilized inside the volume occupied by the laminated structure.

An increase in the width of the blades 15 towards the buffer-tank causes an extra "pumping" effect which is due to the increased surface wetted by the liquid.

In the example illustrated in FIGS. 1 and 2, the blades 15 are four in number and joined at their end 15a opposite that reaching up to the buffer-tank. Of course the number of blades may vary. In addition, it is not necessary for said blades to be joined at their ends 15a.

The use of a collector system such as that formed by the blades 15 has the advantage of being easy to build and of avoiding the use of screenings which are liable to be damaged by the liquid contained inside the enclosure.

But other collector systems can be used, such as for example a system of ribs projecting perpendicularly to the interior wall of the enclosure and reaching up to the buffer-tank.

It is also possible to use a collector system with channels arranged like blades along the interior wall of the enclosure and with at least their wall facing that of the enclosure formed by a screening, said channels reaching an end in the gap 19 and being, by their other ends, separated from the interior volume of the enclosure by a solid wall or by a gas barrier. Such a collector system with channels is in particular described in U.S. Pat. No. 3,176,882.

Other modifications or additions may of course be brought to the description of the invention given hereinabove, without departing from the scope of protection defined in the accompanying claims.

What is claimed is:

1. Surface tension storage system comprising: an enclosure designed to contain a liquid and a pressurant gas, a liquid-expelling device situated close to an outlet of said enclosure and means for feeding liquid to the expelling device, wherein the said liquid-expelling device consists of a structure made up of an assembly of rigid elements defining:
   a grid-like interior surface of the structure which delimits a central passage surrounded by the structure and communicating with the outlet,
   a grid-like exterior surface which opens on to the inside of the enclosure,
   a set of gaps delimited by the surfaces of the said elements, which extend continuously between the interior surface and the exterior surface of the structure and the width of which increases in relation to the distance to the central passage, from a minimum value selected so as to form a gas barrier along the inner surface delimiting the central passage, up to a maximum value selected so as to prevent the liquid contained inside the structure from being expelled into the tank, as long as the ambient acceleration, does not exceed a given threshold, and
   a liquid input to where the feeding system arrives, said structure constituting a buffer-tank from where the liquid may be expelled through the central passage under the effect of the pressurant gas at each liquid-utilizing phase and which is re-filled with the liquid contained in the enclosure by means of the feeding device.

2. Storage system as claimed in claim 1, wherein said buffer-tank and said central passage are closed at the level of the end of said passage which is farthest from the outlet.

3. Storage system as claimed in claim 1, wherein said width increases in the strict sense at least in one part of the structure situated all around the said central passage and bordering said latter.

4. Storage system as claimed in claim 3, wherein said structure comprises a set of plane blades arranged radially around the said central passage.

5. Storage system as claimed in claim 4, wherein said structure comprises at least an extra set of plane elements arranged around said set of radial blades.

6. Storage system as claimed in claim 5, wherein said plane elements are parallel and create between them gaps of constant length.

7. Storage system as claimed in claim 5, wherein said plane elements are discs surrounding the said radial blades and perpendicular thereto.

8. Storage system as claimed in claim 1, wherein said structure occupies a cylindrical volume whose axis is that of the said central passage.

9. Storage system as claimed in claim 8, wherein the said structure has a rectangular-shaped meridian section.

10. Storage system as claimed in claim 1, wherein said structure is separated from the part of the enclosure wall containing the outlet, by a gap where the feeding (system) converges.

11. Storage system as claimed in claim 10, wherein said structure is supported by a plate which faces the said wall part and is provided with apertures for re-filling the buffer tank with liquid.

12. Storage system as claimed in claim 1, wherein said feeding device consists of a set of blades arranged substantially parallel to the enclosure wall and converging to the buffer tank.

13. Storage system as claimed in claim 12, wherein the distance separating the blades from the interior wall of the enclosure is greater than the minimum distance between adjacent elements of the structure.

14. Storage system as claimed in claim 12, wherein the distance separating the blades from the interior wall of the enclosure reduces towards said buffer-tank.

15. Storage system as claimed in claim 12, wherein the width of the blades increases towards said buffer-tank.

* * * * *

UNITED STATES PATENT AND TRADEMARK OFFICE
CERTIFICATE OF CORRECTION

PATENT NO. : 4,397,408

DATED : August 9, 1983

INVENTOR(S) : Michel Robert

Page 1 of 2

It is certified that error appears in the above-identified patent and that said Letters Patent is hereby corrected as shown below:

On the title page, the Abstract should read

--The invention relates to a storage system comprising an enclosure containing a liquid and pressurant gas. Within the storage system is a liquid-expelling device comprising a structure made up of rigid elements which define a grid-like interior surface forming a gas barrier and which delimit a central outlet passage, the structure constituting a buffer-tank. The liquid is expelled through the central passage under the effect of the gas at every phase of utilization. As necessary, the buffer tank is refilled with liquid contained inside the enclosure by means of a feeding system which converges to a liquid input provided in the structure.--

UNITED STATES PATENT AND TRADEMARK OFFICE
CERTIFICATE OF CORRECTION

PATENT NO. : 4,397,408
DATED : August 9, 1983
INVENTOR(S) : Michel Robert

It is certified that error appears in the above-identified patent and that said Letters Patent is hereby corrected as shown below:

Column 8, line 45, "(system)" should read -- system --.

Signed and Sealed this

Eighth Day of May 1984

[SEAL]

Attest:

GERALD J. MOSSINGHOFF

Attesting Officer

Commissioner of Patents and Trademarks